Inventor:—
Vanderveer Voorhees

By Donald E. Payne
Attorney

Inventor:—
Vanderveer Voorhees
By Donald E. Payne
Attorney

United States Patent Office 2,958,637
Patented Nov. 1, 1960

2,958,637

CONVERSION OF HYDROCARBONS

Vanderveer Voorhees, Los Altos, Calif., assignor to Standard Oil Company, Chicago, Ill., a corporation of Indiana Substituted for abandoned application Ser. No. 684,558, July 18, 1946. This application Sept. 9, 1955, Ser. No. 533,341

3 Claims. (Cl. 204—154)

This invention relates to the conversion of hydrocarbons by the application of nuclear energy derived from fissionable elements particularly uranium and plutonium. Such elements when arranged as a sufficiently dense structure and subjected to neutron bombardment disintegrate with the liberation of vast quantities of heat energy and other forms of radiation such as gamma rays and secondary neutron radiation. Two types of disintegration are recognized, one resulting from fast neutron bombardment and the other from slow neutron bombardment. This invention is concerned with the latter type of disintegration and the application to hydrocarbons at conversion temperature of nuclear radiation resulting from such disintegration.

In order to effect maximum neutron capture by the fissionable element employed, it is desirable to employ a neutron retarder or moderator. Suitable moderators are carbon, hydrogen and deuterium, or compounds containing them. These elements have the property of slowing neutrons while absorbing a relatively small percentage thereof.

When applying the energy of nuclear fission to hydrocarbon conversion, I employ a sufficient amount and density of the fissionable element to provide a neutron reproduction factor greater than unity. The reproduction factor is the average number of neutrons emitted in the nuclear fission reaction for each neutron lost in effecting the reaction. The amount and arrangement of the element depends upon the particular element employed. Thus, when employing ordinary uranium containing about 0.7% of the active isotope $U^{235}$, the amount of the element required will be at least about 10 tons and preferably from 20 to 100 tons. If the element contains a higher percentage of the more radioactive isotope $U^{235}$, for example 5 to 10 percent or more, smaller amounts are required to produce an active pile in which the neutron reproduction factor is greater than unit. Alloys and mixtures of ordinary uranium and/or thorium with plutonium, $U^{233}$ or $U^{235}$, may also be employed for the construction of high capacity conversion apparatus.

According to my invention, I provide an arrangement of the fissionable element such that the maximum reproduction factor in the absence of a neutron moderator is substantially below unit. I then expose the hydrocarbon to be treated to the fissionable element in such a way that the hydrocarbon itself serves as a neutron retarder to increase the reproduction factor above unity, thus maintaining the chain reaction necessary for operation of the process. The rate of disintegration, i.e. the nuclear reaction rate, may be regulated by controlling the concentration and flow of the hydrocarbon being subjected to treatment and when desired the nuclear reaction may be instantly halted by discharging the hydrocarbon from the system. Well known cadmium and boron safety rods may of course be employed.

My process is particularly applicable to the cracking of heavy hydrocarbons such as gas oil, kerosene, paraffin, etc., to the reforming, retreating, or isomerization of lower boiling hydrocarbons such as gasoline, heavy naphtha, hexane, pentane, etc., and the isomerization or cracking of certain hydrocarbon gases, particularly butanes.

Several methods and types of apparatus may be employed in carrying out the process. In the drawings accompanying this specification:

Figure 1:
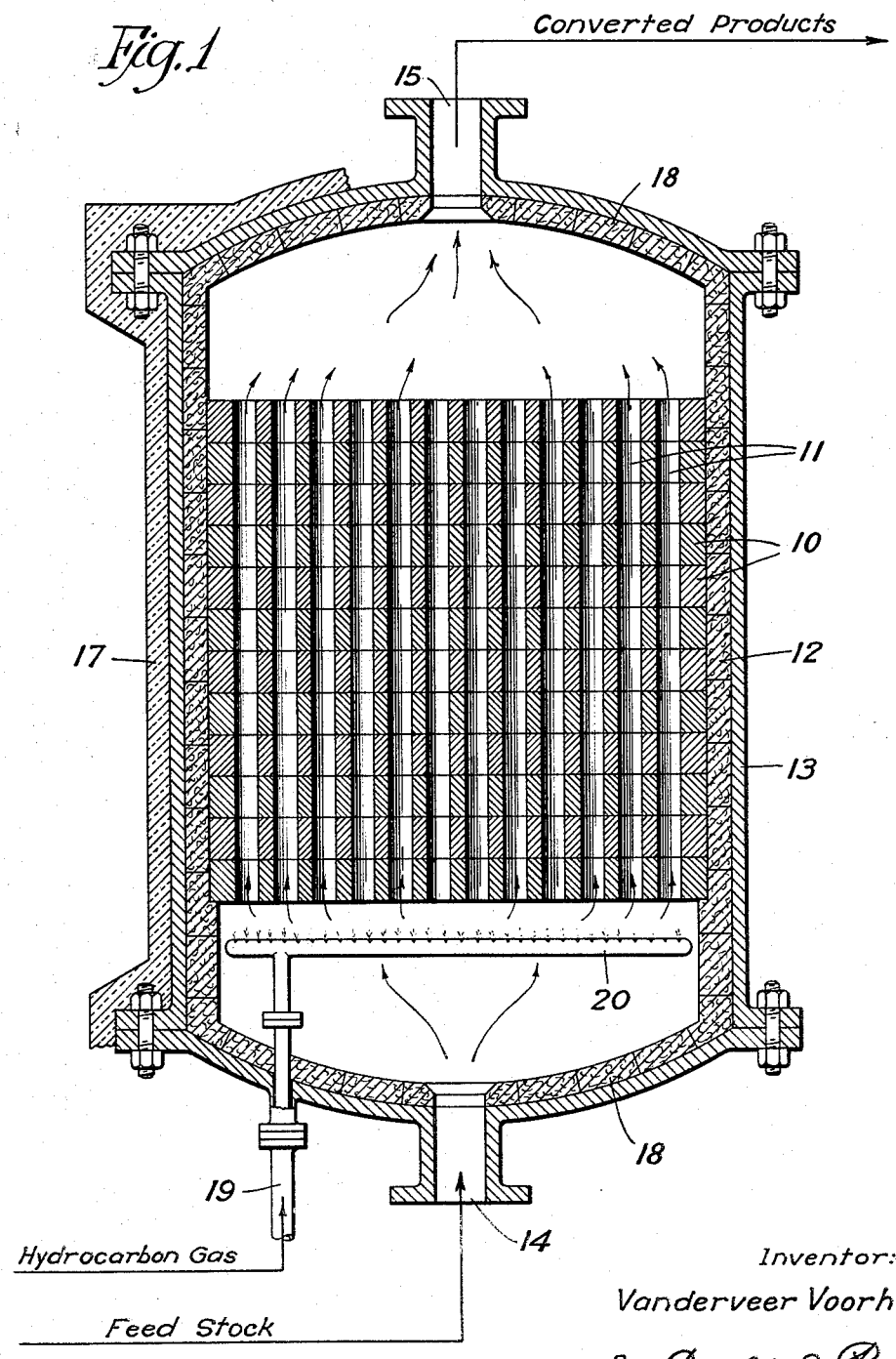
Figure 1 illustrates a stationary pile in which the hydrocarbon is passed in liquid phase or combined liquid and vapor phase thru channels in a dense mass of the fissionable element.

Referring to Figure 1 of the drawings, ordinary uranium metal or uranium metal alloyed with about 1 to 10 percent of the isotope $U^{235}$, or plutonium, is formed into plates or blocks 10, preferably of circular shape provided with holes 11 which may occupy about one-half to three-fourths the cross-sectional area of the plate. These may be made by casting or by punching holes in flat billets or sheets. In a typical apparatus, the uranium plates may be about four feet in diameter and piled about four feet high, the holes in the plates coinciding to provide continuous channels from top to bottom of the pile. Surrounding the pile is a reflecting shield 12 of suitable neutron retarding or moderating material such as carbon or graphite. This shield may be in the form of plates, in granular form, or installed in the form of molded blocks. Outside of shield 12 and enclosing the entire assembly is a structural shell 13 which may be made of carbon steel of sufficient strength to maintain the desired pressure within the apparatus. Ordinarily, pressures of 100 to 500 or even 2000 p.s.i. may be employed. Shield 12 must of course be of sufficient thickness to protect shell 13 from intense fast neutron flux.

In assembling the pile, plates of graphite or other forms of carbon may be spaced between the uranium plates 10 in order to modify the neutron emission and increase the neutron reproduction factor, the amount of such moderator, however, being limited to maintain a reproduction factor slightly below unit. Carbon or graphite employed for this purpose as well as for shield 12 is preferably of high purity to reduce the loss of neutron by capture in other elements.

In operation, the oil such as gas oil, substantially free from heavy metals, sulfur and nitrogen, is introduced at inlet 14, passes upwardly thru the channels in the pile and escapes at outlet 15. The temperature of the products discharged at 15 may be about 750 to 1050° F. or more, preferably about 800 to 950° F. At this temperature, the products may be conducted to a soaking drum and thence to a fractionating tower not shown, for recovery of gasoline and other lighter cracking products. By preheating the feed stock introduced at 14, a certain amount of control of the operation may be achieved and heat for this purpose may be obtained by suitable heat exchange with hot reaction products. Loss of heat from the converter may also be reduced by a suitable insulating jacket 17.

Instead of employing a fixed neutron-reflecting jacket 12 around the radioactive pile, I may provide a space in place thereof and pass a portion of the liquid hydrocarbon feed stock thru the space, thus employing the oil itself as a neutron-reflecting substance. Likewise graphite block lining 18 at the ends of the reactor may be omitted if the operation is conducted to maintain a body of oil at the upper and lower ends of the pile, thus substantially surrounding the fissionable element with the oil undergoing conversion. In this way, the reaction may be controlled by regulating the pressure within the apparatus, thereby controlling the density of the hydrocarbon vapor and the extent of vaporization. As the extent of vaporization increases with reduction in pressure, and the density of the vapors is reduced, the neutron moderating action of the hydrocarbon material diminishes, thereby slowing down or halting the nuclear reaction. By this means, i.e. pressure control, an instantaneous and reliable control of the conversion reaction is effected. This method of stabilization has been demonstrated as being very effective in so-called "water boiler type" reactors (e.g. reactor at Arco).

Instead of introducing the hydrocarbon feed at 14 and withdrawing it at 15, the flow may be reversed, introducing it at the top and removing it at the bottom. In either case, regulation of the extent of vaporization can be facilitated by introducing a hydrocarbon gas, e.g. methane, ethane, propane or butane, at 19, and distributing it across the sectional area of the pile by perforated distributor pipes 20. The gas distributor pipes 20 may be arranged in sections, if desired, to increase the amount of gas and thus decrease the moderating effect of the hydrocarbon oil in any desired area of the reactor.

The temperature of all parts of the reactor can be indicated constantly by suitable thermocouples imbedded therein. Because the fissionable element in the central part of the pile is subjected to a higher intensity of neutron radiation, the oil in this region of the apparatus may become heated to a higher temperature than in other areas. The introduction of a larger amount of gas thru 19 into the central zone of the reactor may be employed to offset this overheating effect. The same result may be accomplished by reducing the ratio of the volume of fissionable element to channel space represented by holes 11 in this central zone. In general, however, localized overheating is automatically avoided by the factor of increased vaporization at points of overheating, resulting in decrease in moderating action of the hydrocarbon employed in the process.

Figure 2:
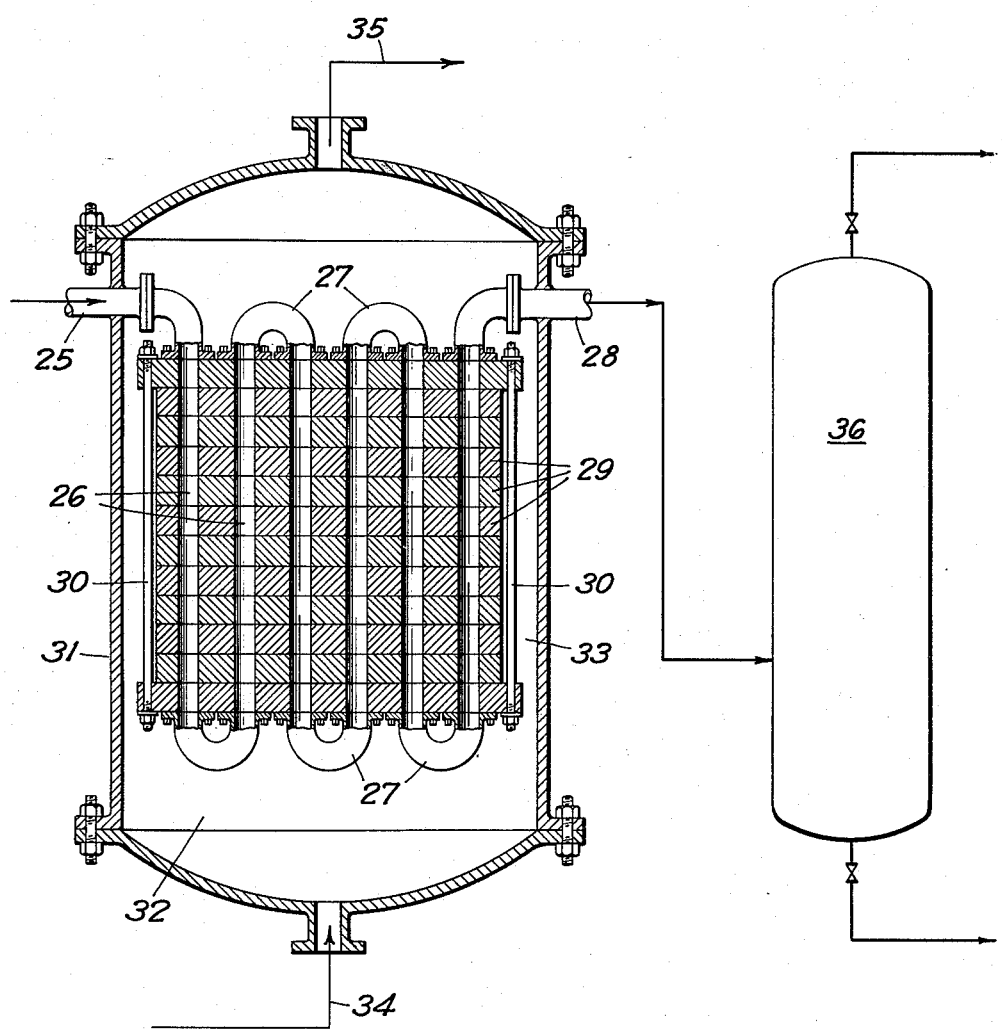
Figure 2 is a modified form of the apparatus shown in Figure 1 having the channels arranged for series flow.

Figure 2 shows an alternative arrangement of the flow thru channels 11 in Figure 1. According to this arrangement, the feed stock is introduced by line 25 to channels 26 which are connected in series by return bends 27, the heated oil being discharged at 28. Uranium sheets or plates 29 thru which channels 26 pass may be held tightly together by tie rods or bolts 30, preferably placed on the outside of the pile to avoid neutron absorption and dissipation. The entire assembly may be contained within presure shell 31, preferably constructed of steel, and filled with oil under pressure to serve as a neutron reflector for the pile and balance the pressure within channels 26, thereby preventing leakage from said channels. Oil for this purpose may be the same oil as treated in the process or a special oil of high boiling point suited to the purpose. When sulfur-containing oils are processed, the uranium may be protected by a coating of a material resistant to sulfur corrosion, e.g. aluminum or zirconium, and the oil in shell 31 filling spaces 32, 33, etc., may be free of sulfur to avoid corrosion problems. For this purpose I may use a heavy paraffin oil, paraffin wax, or an aromatic oil such as diphenyl, diphenyl oxide, dinapthyl, or mixtures thereof. This oil may be supplied under pressure by line 34 and withdrawn continuously or intermittently by line 35 to prevent excessive decomposition. A slurry of oil and graphite, e.g. diphenyl and graphite, may be used for this purpose to increase the density and neutron-reflecting power. A suitable heat-insulating jacket or space may be maintained between the uranium pile 29 and the reflecting oil jacket in space 32 and 33 to reduce the heat imparted to the oil in the said jacket. Reflecting jacket 33 may have a thickness of about 4 to 12 inches or more.

Channels 26 may be connected in banks manifolded to inlet 25 and outlet 28, and the hydrocarbon stream may be passed first thru the central channels of the pile to absorb a maximum amount of the heat there available. As in the case of the operation described in connection with Figure 1, the pressure on the hydrocarbon streams undergoing treatment in channels 26 is controlled, for example by a pressure release valve, not shown, in outlet line 28 from soaking chamber 36. If the hydrocarbon charging stock is clean and substantially free of unvaporizable constituents, and the vapor velocity in channel 26 is high, a long period of operation may be obtained before deposition of carbon deposits in the heating channels 26 requires dismantling the connections thereto and removing the carbonaceous deposits. If it is desired to employ catalysts in the conversion reaction, they may be supplied to chamber 36. Thus a silica-alumina cracking catalyst may be used in chamber 36 in a granular, fixed or moving bed or in the form of fluidized powder.

Figure 3:
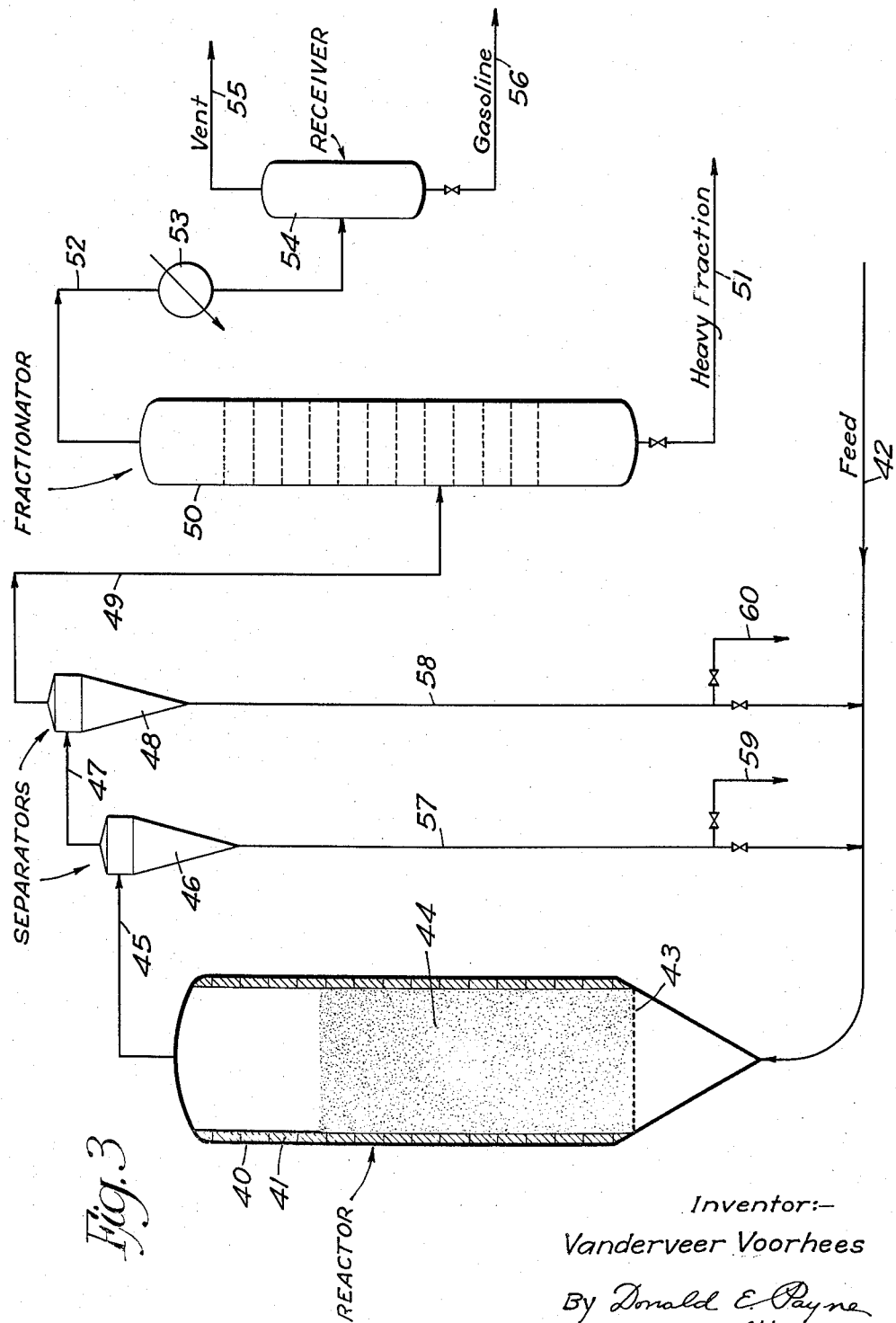
Figure 3 illustrates an apparatus for carrying out the process employing a fissionable element in small particles maintained in rapid motion to provide better control of the nuclear reaction.

Instead of operating with a fissionable element in a fixed structure or bed, I may employ it in the form of small particles, i.e. granules or shot, and suspend them in the hydrocarbon to be treated. Figure 3 shows an apparatus suitable for this type of operation. Reaction vessel 40 suitably equipped with a graphite neutron reflecting liner 41 is charged with about 5 to 100 tons of granular uranium metal, uranium carbide ($U_2C_3$), uranium oxide, $UO_2$, or other suitable compound of ordinary uranium or uranium enriched in U–235. When an oxide is used it is preferred to employ a fused oxide having a high density and resistance to abrasion. The granular particles or shot are preferably rounded or spheroidal in shape and of a size within the range of about 50 to 200 mesh, although finer particles may also be employed with advantage where complete fluidization is desired. Thus particles of 10 to 1200 microns diameter may be employed under certain conditions.

The hydrocarbon feed stock, e.g. gas oil or kerosene, is charged by line 42 and enters the bottom of the reactor 40 passing upwardly thru grid 43 which serves to distribute the flow of hydrocarbon across the reaction chamber and provide a uniformly turbulent dispersion of the fissionable heating agent 44. The hydrocarbon feed stock may be supplied in vapor form and the velocity of the vapors passing upwardly thru reactor 40 may be maintained at about one-half foot per second to five feet per second, depending on the rate of heat evolution desired in the reactor. By increasing the velocity of the vapors, the density of the mass of fissionable material is reduced, thus reducing the neutron reproduction factor for the system. The hydrocarbon vapors are separated from the nucleo-thermal agent within the upper part of the reactor 40 and the vapors are withdrawn by line 45, leading to separator 46 and thence by line 47 to separator 48 whence the vapors pass by line 49 to fractionator 50, wherein they are separated into desirable components, a heavy fraction being withdrawn by line 51 and a light fraction, for example, being withdrawn by line 52, condensed in condenser 53, and thence conducted to receiver 54 which is vented at 55. The gasoline product is withdrawn by line 56.

From separators 46 and 48 recovered fissionable material may be recycled by lines 57 and 58 to reactor 40. Carbon produced in the cracking reaction in 40 may also be recycled in the same way or it may be removed by lines 59 and 60. If cyclone separators 46 and 48 are designed correctly, most of the fissionable material carried over in the vapors thru line 45 can be recovered in 46 and recycled while the carbon suspended in the vapors may be carried over to separator 48 and withdrawn from the system by lines 58 and 60. Discarded carbon can be processed for the recovery of radioactive material.

Figure 4:
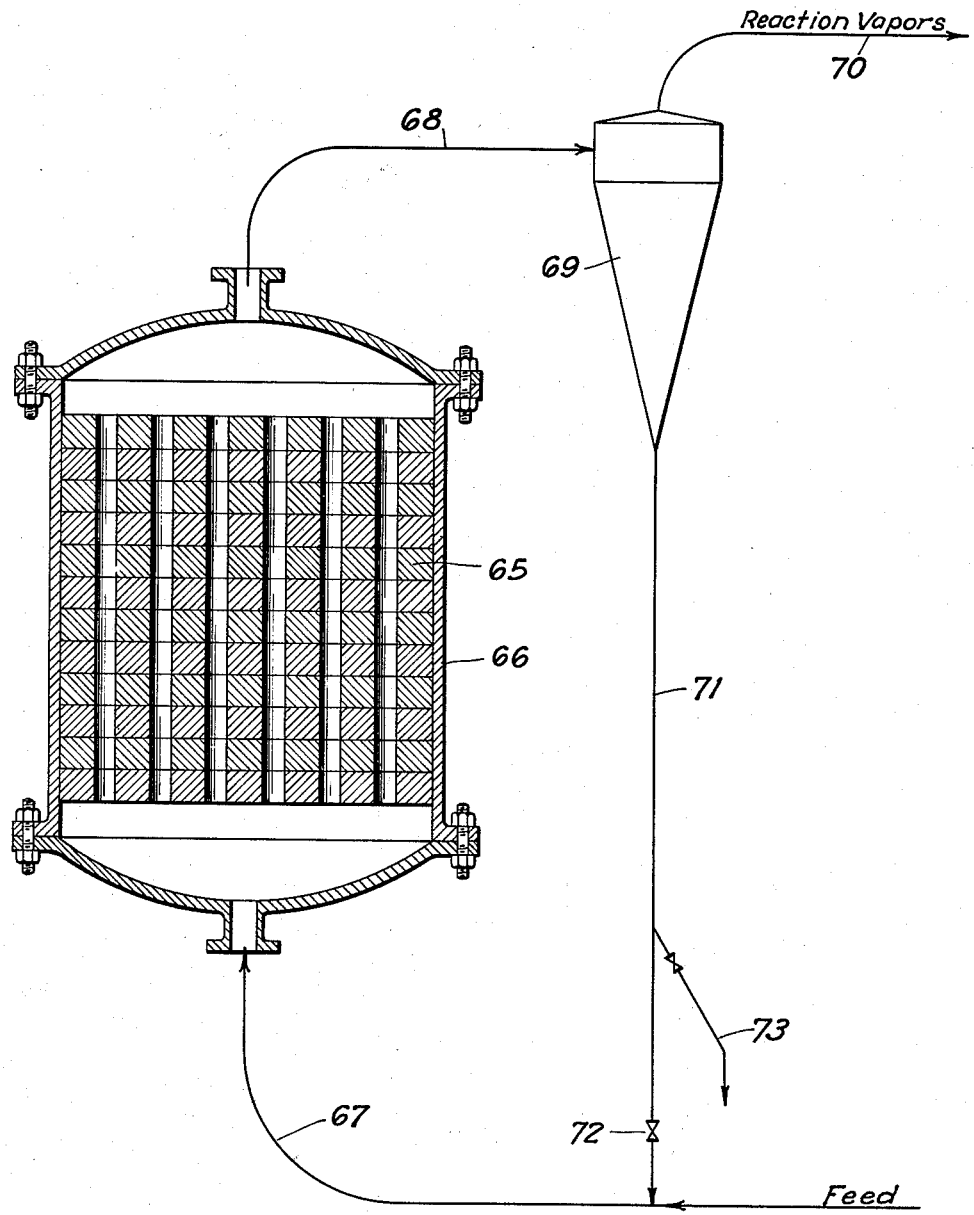
Figure 4 shows an apparatus in which graphite or carbon is recycled thru the pile as a more or less dense suspension in a gaseous hydrocarbon, thereby serving as a variable moderator.

Referring now to Figure 4, the apparatus shown is similar to that illustrated in Figure 1, the essential element being the block or pile 65 of fissionable material, e.g. uranium, surrounded by a neutron-reflecting jacket, not shown, and enclosed in shell 66. Hydrocarbon vapors are charged to the reactor by line 67 and the reaction products are withdrawn by line 68 leading to cyclone separator 69 and thence by line 70 to the product recovery system. Graphite or carbon is suspended in the vapors in a dense fluid suspension, separated from the product vapors in separator 69 and recycled to the reactor thru standpipe 71 and thence by line 67. Sufficient pressure head is maintained in standpipe 71 to overcome the resistance to flow in reactor 65. The rate of recycling of the carbon thru the reactor is controlled by valve 72 which may conveniently be a star valve or a slide valve. Powdered fissionable material may also be suspended in the vapors circulated thru the reactor.

In operating this modification of a neutron-excited, hydrocarbon conversion process, the density of the carbon suspension in the hydrocarbon vapors passing thru the reactor is controlled to regulate the neutron reproduction factor. Graphite densities of 5 to 25 pounds per cubic foot of vapor in the reactor are readily obtainable. Formation of carbon in the process serves to maintain the supply of suspended carbon and offset that lost with the product vapors leaving separator 69. When the amount of carbon in the system becomes excessive, a part of it is removed from time to time by line 73.

Figure 5:
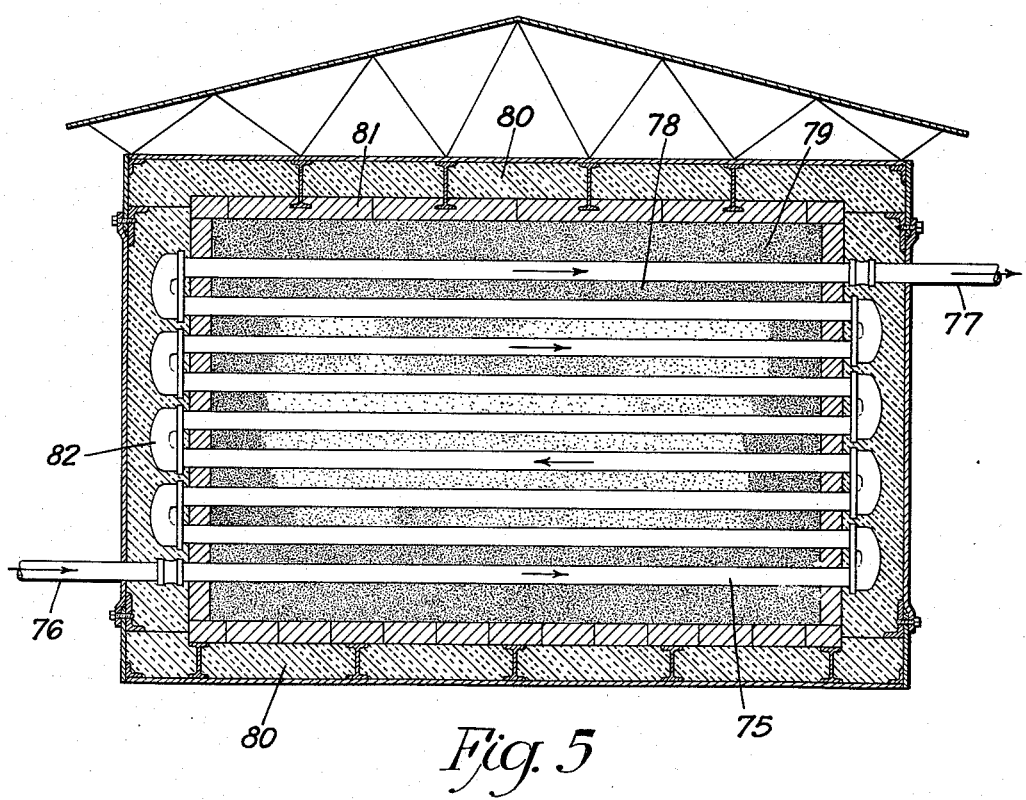
Figure 5 is an apparatus in which a tubular arrangement of reactor is shown providing for conversion of hydrocarbons by the combined effect of heat and nuclear radiation.

The apparatus shown in Figure 5 provides a tubular coil 75 with inlet 76 and outlet 77 contained within nuclear distintegration chamber 78. Surrounding coil 75 and packed densely between the tubes thereof is a mixture 79 of fissionable element and neutron retarder, in which the portion of neutron retarder or moderator is insufficient to provide a sustained nuclear chain reaction when coil 75 is empty of hydrocarbon. When a stream of hydrocarbons such as naphtha or gas oil is passed thru the coil, sufficient additional neutron-moderating effect is obtained from the hydrocarbon to maintain the desired chain reaction and produce sufficient heat and nuclear radiation to effect the desired conversion of the hydrocarbon during its passage thru the coil.

It is desirable that the dimensions of the reaction chamber 78 approach those of a cube in order to approach the maximum compactness and reduce thermal losses by radiation and/or convection. The space 80 surrounding the coil at the bottom, top and sides may be packed with a good heat-insulating material such as asbestos, magnesia, or silica alcogel although usually ordinary concrete can be used. Neutron-reflecting screen of graphite blocks 81, etc., is interposed between the heat-insulating space 80 and the interior of the reaction chamber 78.

Tubes 79 and return bends 82 may be constructed of uranium metal which may be lined with aluminum to prevent corrosion, particularly by sulfur compounds present in the hydrocarbons undergoing treatment, or the tubes may be constructed of aluminum or other suitable metal of low neutron-absorbing capacity. Return bends 82 may be made removable to facilitate periodic cleaning.

The vaporized products from 77 are conducted to a fractionating tower where gasoline and other desired conversion products are finally recovered by fractionation.

Where sulfur is present in the hydrocarbon charging stock supplied at 76, the stock may be initially treated to remove sulfur compounds; for example, by treatment with sulfuric acid, mercaptan extraction with caustic-solutizer solution, or other suitable method. To prevent corrision of uranium tubes in coil 75 by sulfur, the tubes may be lined with a layer of aluminum which may be fused thereto to provide a satisfactory bond for the purpose of heat conduction and durability. Aluminum-lined tubes may be prepared by the calorizing process. In the operation of the apparatus in Figure 5, no reaction occurs until oil is charged to the apparatus, thereby providing a neutron retarder and initiating the radioactive exothermic reaction. The packing mixture 78 may be a mixture of finely granular metallic uranium containing from 0.7 to 10 percent of an active isotope $U^{235}$. Chemically pure graphite in intimate admixture with the granular uranium as an accelerator may be present in the amount of about 25 to 75 percent, depending on the particular reaction chamber design employed, the amount of graphite or other neutron retarder being just insufficient to establish a neutron reproduction factor of unity. As indicated hereinabove, the passage of hydrocarbons such as gas oil thru the apparatus supplies sufficient neutron retardation to establish the desired nuclear reaction. This effect may also be obtained by the use of a secondary hydrocarbon fluid in a separate coil, not shown, withing reaction chamber 78. For this purpose a hydrocarbon highly resistant to thermal decomposition is desirable, examples being benzene, xylene, naphthalene, diphenyl, etc. By controlling the amount of such secondary hydrocarbon fluid circulated thru reaction chamber 78, the rate of the nuclear disintegration reaction can be independently controlled as desired.

In conducting reactions with fissionable materials, it is necessary to shield the reaction vessels containing the fissionable elements and also the vessels and lines containing the products recently exposed to the fissionable elements. For this purpose I may employ water or other hydrogen-containing substance, preferably paraffin oil or wax, and to prevent escape of gamma rays a suitable lead shielding is desirable.

The hydrocarbon conversion reactions effected in the process are accelerated not only by the heat of the nuclear reaction in the reaction vessel but also by exposure to the high concentration of nuclear radiations which serve to disrupt the bonds in the carbon atoms and speed the desired chemical reaction. The breaking down of heavy hydrocarbons into gasoline is accordingly greatly facilitated. Extraneous hydrogen may be introduced into the reaction vessel with the hydrocarbon feed stock to effect the simultaneous destructive hydrogenation. When using hydrogen, higher pressures may be employed, for example from 100 to 5000 p.s.i. or more. High sulfur stocks may be treated to substantially eliminate their sulfur content where neutron loss by sulfur absorption is excessive. When sulfur is present in the reactor, the product may require six months storage before use.

In addition to the method of controlling the rate of nuclear reaction by controlling the concentration of modifying agent in the reactor, I may also control the rate of fission by controlling the spacing of the fissionable material in the reactor. Thus, in the apparatus shown in Figures 1 and 4, the uranium blocks 10 and 65 can be spaced apart to reduce the activity of the pile to any desired degree. In the case of the reaction system shown in Figure 3, varying the rate of flow of hydrocarbons upwardly thru the reactor provides an increase or decrease in the density of the fissionable material in suspension therein, thereby providing a corresponding increase or decrease in the rate of nuclear energy production.

This application is a substitute for my abandoned application Serial Number 684,558 of July 18, 1946.

Having thus described my invention what I claim is:

1. In the application of the energy of nuclear fission to processes of hydrocarbon conversion at elevated temperatures and pressures, the technique of process control which comprises introducing a stream of hydrocarbons other than aromatics, and which are more susceptible to molecular conversion by thermal reaction, as charge oil to a reaction zone containing a fissionable material having a mass and geometrical arrangement providing a maximum neutron reproduction factor in the absence of said hydrocarbons substantially below unity, regulating the concentration and flow of hydrocarbons within the reaction zone by maintenance of super-atmospheric pressure at a hydrocarbon discharge temperature of about 750° to 1050° F., whereby the density and extent of vaporization of hydrocarbons within the reaction zone are controlled to increase the reproduction factor above unity, and thereafter regulating the concentration and flow of hydrocarbons undergoing conversion within the reaction zone in said manner to maintain during the reaction period a stabilized reaction wherein the hydrocarbons in said reaction zone simultaneously moderate the neutron radiation from the fissionable material therein while undergoing conversion induced by the action of the thermal and radioactive radiation within the reaction zone.

2. The method of claim 1 which comprises subjecting said hydrocarbons to the action of heat and nuclear radiation in a reaction zone containing a mass of subdivided fissionable material, passing a stream of said hydrocarbons upwardly thru said mass and regulating the rate of reaction by controlling the upflowing velocity of said hydrocarbons thru said reaction zone, thereby varying the density of said mass of fissionable material.

3. The process of claim 2 wherein said hydrocarbons are maintained in the liquid phase and said fissionable material, in granular form, is maintained in suspension therein.

References Cited in the file of this patent
UNITED STATES PATENTS

| | | |
|---|---|---|
| 2,743,223 | McClinton et al. | Apr. 24, 1956 |

FOREIGN PATENTS

| | | |
|---|---|---|
| 697,601 | Great Britain | Sept. 23, 1953 |
| 708,901 | Great Britain | May 12, 1954 |
| 233,011 | Switzerland | Oct. 2, 1944 |

OTHER REFERENCES

Went et al.: Nucleonics, September 1954, pages 16–19.

Smyth, H. D.: "A General Account of the Development of Methods of Using Atomic Energy for Military Purposes," page 16, August 1945.

Bolt et al.: "AECD 3711," 9 pages, U.S.A.E.C., Mar. 15, 1955, which is the date relied upon; declassified Nov. 10, 1955.

Francis IDO 16189. 46 pages U.S.A.E.C., Aug. 11, 1954, which is the date relied upon; declassified Aug. 26, 1955.